(12) United States Patent
Eisinger et al.

(10) Patent No.: US 8,280,357 B2
(45) Date of Patent: Oct. 2, 2012

(54) INFORMATION SHARING AFTER PROXIMITY CONNECTION HAS ENDED

(75) Inventors: Jacob D. Eisinger, Austin, TX (US); Michael C. Hollinger, Round Rock, TX (US); Jennifer E. King, Austin, TX (US); Christina K. Lauridsen, Austin, TX (US); Fabian F. Morgan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 12/829,608

(22) Filed: Jul. 2, 2010

(65) Prior Publication Data

US 2012/0003965 A1    Jan. 5, 2012

(51) Int. Cl.
 *H04M 3/42* (2006.01)
(52) U.S. Cl. .................................. 455/414.1; 455/411
(58) Field of Classification Search .............. 455/411, 455/412.2, 414.1, 414.2
 See application file for complete search history.

(56) References Cited

U.S. PATENT DOCUMENTS

| | | | |
|---|---|---|---|
| 6,064,980 | A | 5/2000 | Jacobi et al. |
| 6,266,649 | B1 | 7/2001 | Linden et al. |
| 6,317,722 | B1 | 11/2001 | Jacobi et al. |
| 6,873,967 | B1 | 3/2005 | Kalagnanam et al. |
| 7,130,814 | B1 | 10/2006 | Szabo et al. |
| 7,263,529 | B2 | 8/2007 | Cordery et al. |
| 7,266,583 | B2 | 9/2007 | Fitzpatrick et al. |
| 2003/0105682 | A1 | 6/2003 | Dicker et al. |
| 2004/0093274 | A1 | 5/2004 | Vanska et al. |
| 2006/0097044 | A1 | 5/2006 | Boyd et al. |
| 2006/0230037 | A1 | 10/2006 | Sugiyama et al. |
| 2007/0161402 | A1 | 7/2007 | Ng et al. |
| 2007/0203807 | A1 | 8/2007 | DeAngelis |
| 2008/0062940 | A1 | 3/2008 | Othmer et al. |
| 2008/0140788 | A1 | 6/2008 | Carter et al. |
| 2008/0160910 | A1 | 7/2008 | Khedouri et al. |
| 2008/0235005 | A1 | 9/2008 | Golan et al. |
| 2008/0305813 | A1 | 12/2008 | Rao et al. |
| 2009/0011743 | A1 | 1/2009 | Johanson et al. |

(Continued)

FOREIGN PATENT DOCUMENTS

WO    WO 2007/003045 A1    1/2007

OTHER PUBLICATIONS

U.S. Appl. No. 12/829,589, filed Jul. 2, 2010, Eisinger et al.

(Continued)

*Primary Examiner* — Sam Bhattacharya
(74) *Attorney, Agent, or Firm* — Yee & Associates, P.C.; Mark C. Vallone

(57) ABSTRACT

The different illustrative embodiments provide a method, system, and computer program product for sharing a list passed in a shared direct communication environment after a direct communication has ended among mobile devices. A profile associated with the first mobile device in a storage of a server computer is accessed by an indirect transceiver in the second mobile device responsive to a second mobile device acquiring an information that is responsive to a list previously received from a first mobile device and responsive to the information being acquired during a time when there is no direct communication between the first mobile device and the second mobile device. A contact information is retrieved, and the information is sent to a location specified by the contact information.

22 Claims, 11 Drawing Sheets

U.S. PATENT DOCUMENTS

| | | | |
|---|---|---|---|
| 2009/0076912 A1* | 3/2009 | Rajan et al. | 705/14 |
| 2009/0089806 A1 | 4/2009 | Mayer | |
| 2009/0112982 A1 | 4/2009 | Kuhlmann et al. | |
| 2009/0191898 A1 | 7/2009 | Lewis et al. | |
| 2009/0228513 A1 | 9/2009 | Tian | |
| 2009/0240518 A1 | 9/2009 | Borom et al. | |
| 2009/0271284 A1 | 10/2009 | Arbib | |
| 2009/0292785 A1 | 11/2009 | Leedberg et al. | |
| 2010/0030619 A1 | 2/2010 | Ofer et al. | |

OTHER PUBLICATIONS

U.S. Appl. No. 12/829,644, filed Jul. 2, 2010, Eisinger et al.

BlackBerry Java Application Integration Version 5.0 Beta Development Guide, Section 5, pp. 38-52, published Nov. 9, 2009, Research in Motion, Canada.

Bai et al., "FD/I-Based personalized recommendation in Context-aware Application", 2007 International Conference on Multimedia and Ubiquitous Engineering, IEEE 2007, pp. 1-6.

Menasalvas et al., "Context-aware recommendations in ubiquitous devices", ECML 2008, Madrid, Spain, pp. 1-12.

Park et al., "Location-Based Recommendation System Using Bayesian user's Preference Model in Mobile Devices", UIC 2007, LNCS 4611, pp. 1130-1139, Springer-Verlag, 2007.

Ferscha et al., "Context-Aware Profiles", 2006 International Conference on Autonomic and autonomous Systems ICAS'06, San Jose, CA Jul. 2006, pp. 1-8.

Ferscha, "Everyobjects in the Pervasive Computing Landscape", OTM Confederated International Conferences, CoopIS, Montpellier France, 2006, Abstract, 1 page.

"Google Reader", 1 page, retrieved May 3, 2010 google.com.

"Mobile marketing" Wikipedia, pp. 1-7, retrieved May 4, 2010

Yee, "New perspectives on the shared cataloging environment and a MARC 21 shopping list", pp. 1-43, Jul. 2004, Postprints, UC Los Angeles.

Roussos et al., "Designing appliances for mobile commerce and retailtainment", Pers Ubiquit Comput (2003) pp. 203-209.

"Method and System for Facilitating a Merchant to Electronically Distribute Cooperative Coupons Associated with Promotional Offers to Mobile Devices of Consumers", Jun. 4, 2010, IP.com 196511D, pp. 1-5.

"Method and System for Aggregating Preference Tags associated with Users and Electronically Sharing Preference Tags Clouds with Service Providers and Users", Jun. 3, 2010, IP.com 196487D, pp. 1-6.

"Method and System for EnablingConsumers to Trade Electronically Distributed Coupons", Jun. 4, 2010, IP.com 196512D, pp. 1-5.

"Method and system for Electronic Dissemination of Proximity-based Personalized Advertisements", Jun. 4, 2010, IP.com 196509D, pp. 1-4.

"Method and System for Electronically Distributing Coupons for Promotional Offers" Jun. 4, 2010, IP.com 196513D , pp. 1-5.

* cited by examiner

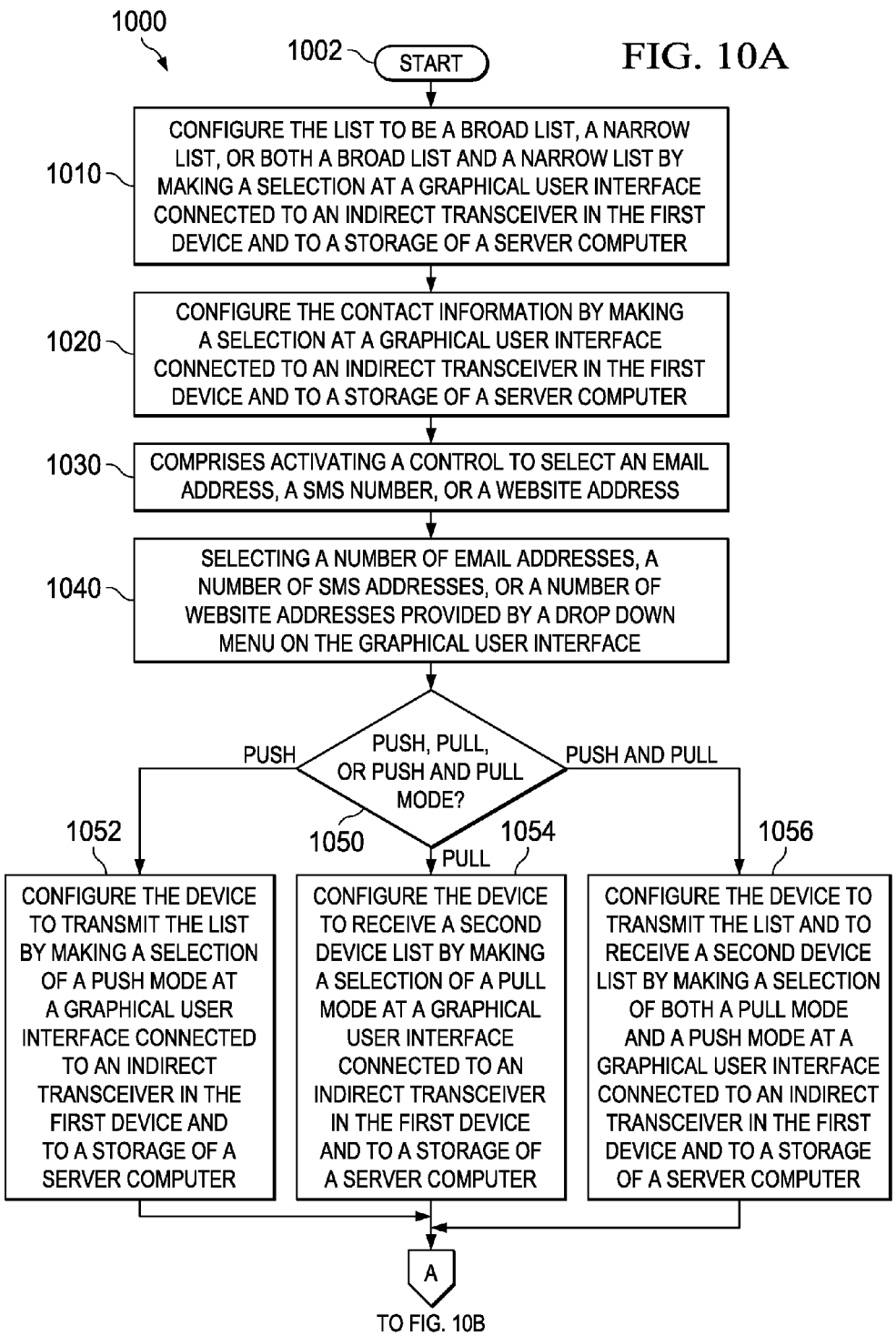

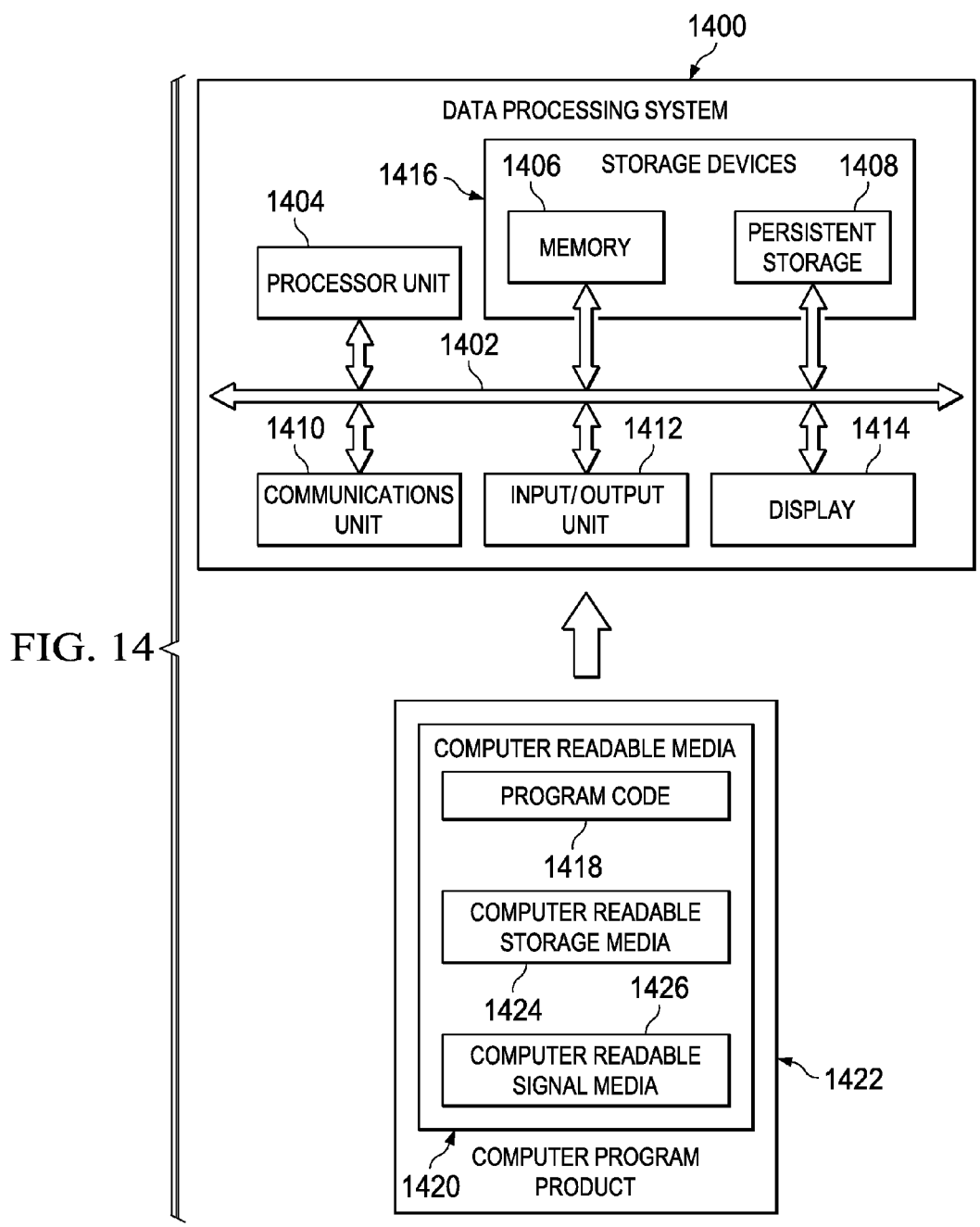

INFORMATION SHARING AFTER PROXIMITY CONNECTION HAS ENDED

BACKGROUND

1. Field

The disclosure relates generally to telecommunications and more specifically to direct communication among mobile devices for file sharing at time after a sending mobile device is out of range of a receiving mobile device.

2. Description of the Related Art

Mobile devices and smart phones are platforms for innovation, software services, viral marketing and advertising distribution. Viral dissemination of information among proximate mobile devices via remote communication such as Bluetooth is one method of performing these functions.

Information may be exchanged among mobile devices in a number of ways. One way is by direct communication between two mobile devices that are located in positions within range of each other. Another way is by indirect communication through wireless connections and the Internet. When information is exchanged by direct communication when two mobile devices are in range, issues arise as to utilization of the information when the mobile devices move beyond range of each other.

Therefore, it would be desirable to have a method, apparatus, and computer program code that may overcome one or more of the issues described above, as well as other possible issues.

SUMMARY

The different illustrative embodiments provide a method, system, and computer program product for sharing a list passed in a shared direct communication environment after a direct communication has ended among mobile devices. A profile associated with the first mobile device in a storage of a server computer is accessed by an indirect transceiver in the second mobile device responsive to a second mobile device acquiring an information that is responsive to a list previously received from a first mobile device and responsive to the information being acquired during a time when there is no direct communication between the first mobile device and the second mobile device. A contact information is retrieved, and the information is sent to a location specified by the contact information.

BRIEF DESCRIPTION OF THE SEVERAL VIEWS OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

FIGS. 10A and 10B are a flowchart of a configuration process in accordance with the illustrative embodiments;

FIG. 14 is data processing system in which illustrative embodiments may be implemented.

DETAILED DESCRIPTION

Figure 1:
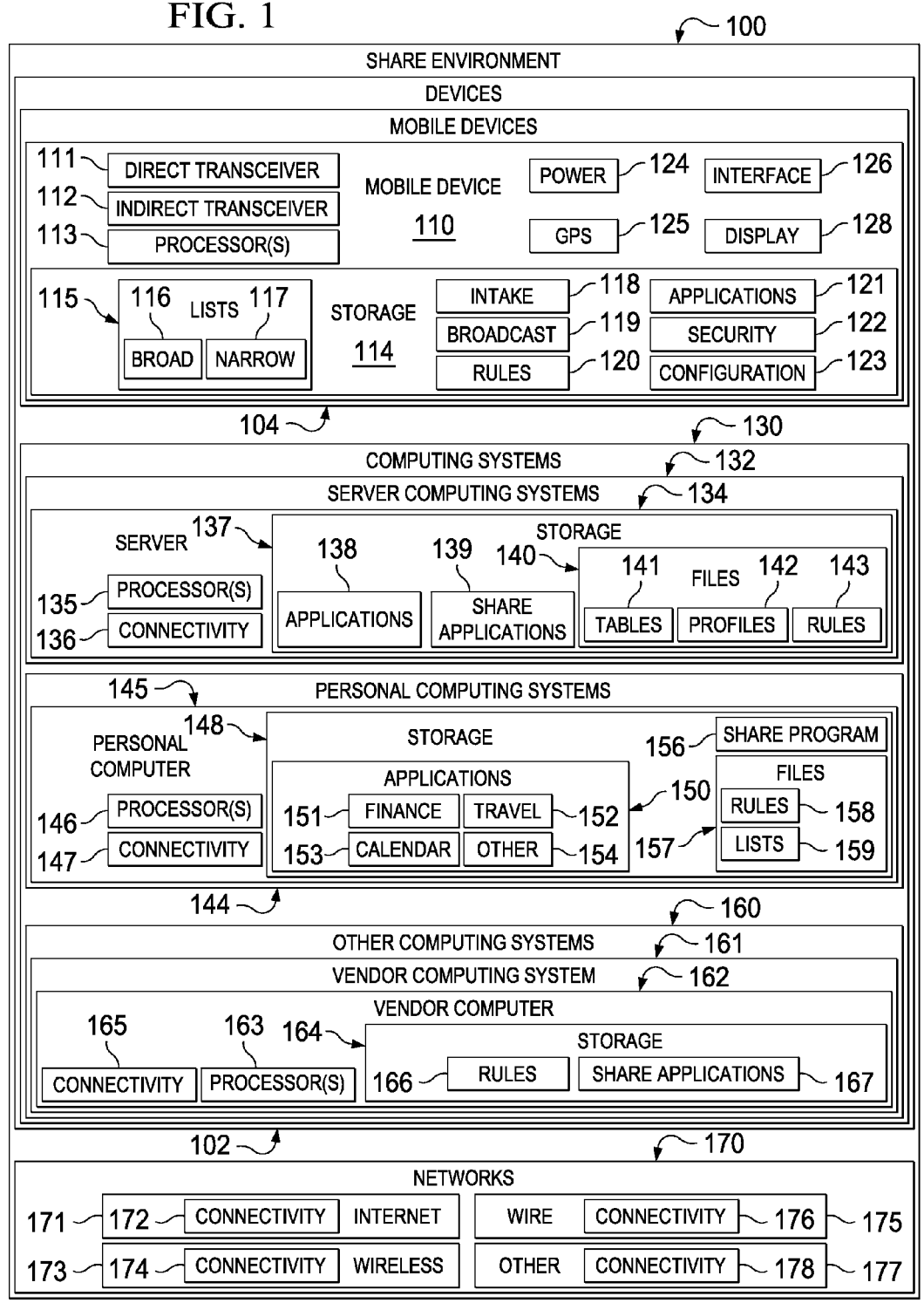
FIG. 1 is a share environment in which an illustrative embodiment may be implemented.

FIG. 1 is a block diagram of a share environment depicted in accordance with the illustrative embodiments. As used herein, a "share environment" is an environment in which mobile devices are configured to communicate directly via direct communication transceivers when one mobile device is within range of another mobile device and indirectly, without regard to the range of either mobile device's direct communication transceiver, via indirect communication transceivers in each mobile device. Share environment 100 may comprise devices 102 and networks 170. Devices 102 may comprise mobile devices 104 and computing systems 130. As used herein, "a number" means one or more. Mobile devices 104 may comprise a number of mobile devices such as mobile device 110. Mobile device 110 may comprise direct transceiver 111, indirect transceiver 112, a number of processors 113, storage 114, power supply 124, geophysical positioning system 125, and interface 126. Additional illustrative examples of mobile devices are mobile devices 210 and 230 in FIG. 2. Storage 114 may comprise lists 115, intake 118, broadcast 119, rules 120, applications 121, security 122, and configuration 123. Lists 115 may comprise broad 116 and narrow 117.

The illustrative embodiments recognize and take into account use of "Wish to Have" and "Key Need" lists. The "Wish to Have" list is defined as a list of categories of information that the user is interested in. The "Key Need" list refers to information that the user really wants to have information about.

The illustrative embodiments recognize and take into account the desirability of dynamically changing a user's "Wish to Have" list based on popularity of requests and various other configurable options relating to the mobile devices in aggregate that a user has been in proximate connection with. In an illustrative example, broad list 116 may be a "Wish to Have" list and narrow list 117 may be a "Key Need" list.

Computing systems 130 may comprise server computing system 132, personal computing systems 144 and other computing systems 160. Server computing systems 132 may comprise a number of servers such as server 134. Server 134 may comprise a number of processors 135, connectivity 136, and storage 137. Storage 137 may comprise applications 138, share applications 139, and files 140. Files 140 may comprise tables 141 profiles 142, and rules 143.

Personal computing systems 144 may comprise a number of personal computers such as personal computer 145. Personal computer 145 comprises processors 146, connectivity 147, and storage 148. Storage 148 may comprise applications 150, files 157, and share program 156. Applications 150 may comprise finance 151, travel 152, calendar 153 and other applications 154. Files 157 may comprise rules 158 and lists 159.

Figure 2:
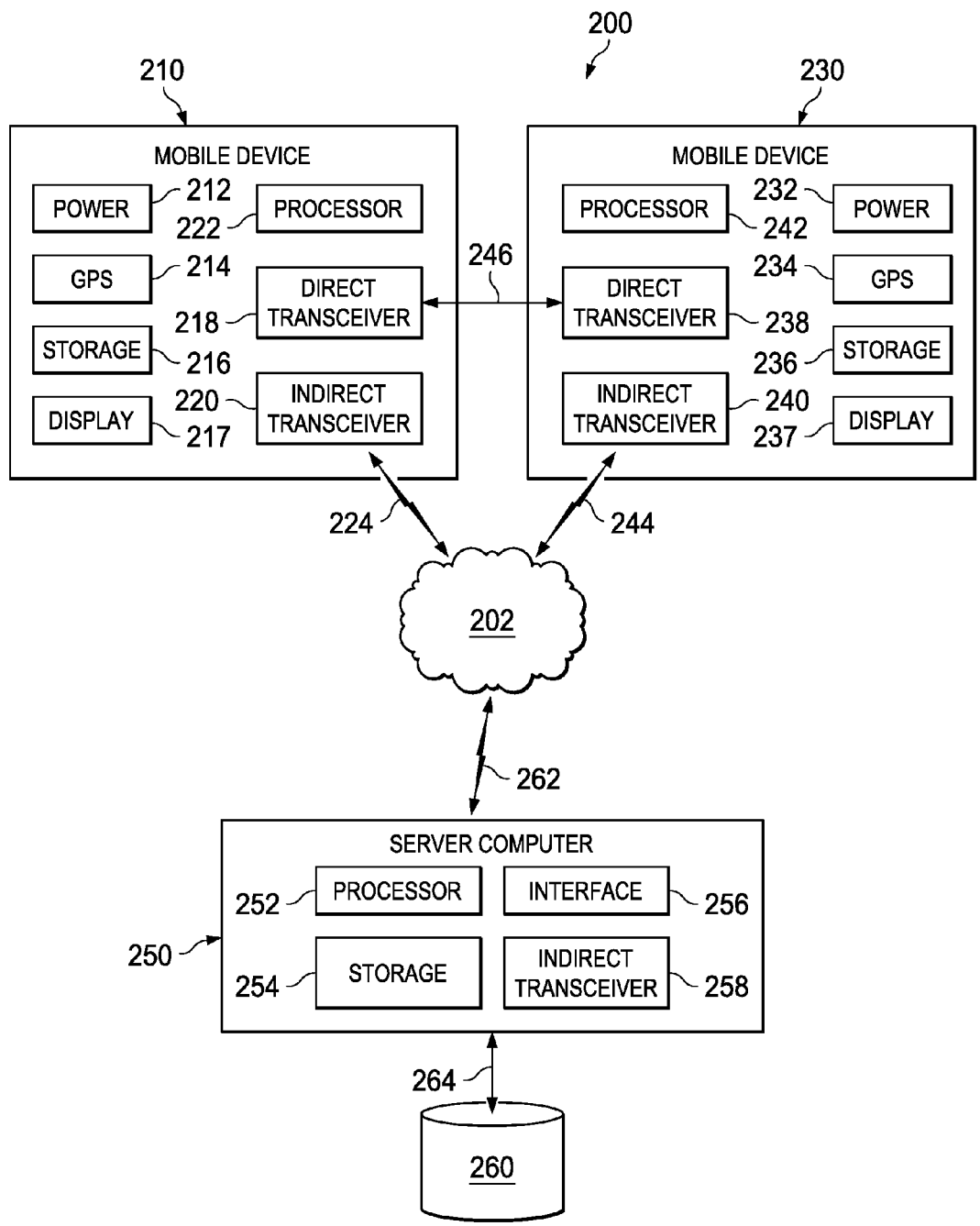
FIG. 2 is a share network in which illustrative embodiments may be implemented.
Figure 3:
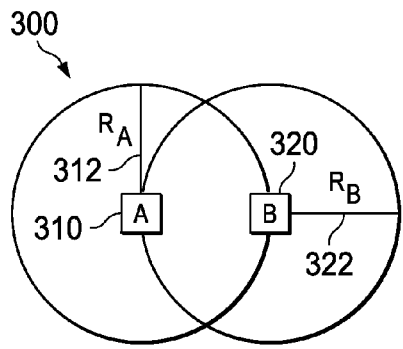
FIG. 3 is a time step diagram in conjunction with FIGS. 4-6 in which illustrative embodiments may be implemented.

The illustrative embodiments recognize and take into account that share program 156 may enable integration of such files as finance 151, travel 152, calendar 153, and other 154 with mobile devices such as mobile device 110 in FIG. 1 and mobile devices 210 and 230 in FIG. 2.

Other computing systems 160 may comprise a number of computing systems such as vendor computing systems 161. Vendor computing systems 161 may comprise a number of vendor computing systems such as vendor computer 162. Vendor computer 162 may comprise a number of processors 163, storage 164, and connectivity 165. Storage 164 may comprise share applications 167 and rules 166.

The illustrative embodiments recognize and take into account vendor computing systems 161 may provide coupons for redemption of incentives and provide information to a mobile device that the mobile device may not have obtained without an interaction with a vendor computing system such as vendor computing system 161.

Networks 170 may comprise internet 171, wireless 173, wire 175, and other 177. Internet 171 may comprise connectivity 172. Wireless 173 may comprise connectivity 174. Wire 175 may comprise connectivity 176. Other network 177 may comprise connectivity 178. Connectivity 172, 174, 176, and 178 may be illustrative examples of applications and hardware that may enable communication between mobile devices 104 and computing systems 130. Other networks 177 may represent any other network that is known or that may be known to persons skilled in the art and that is suitable for establishing communication between mobile devices 104 and computing systems 130.

Referring to FIG. 2, a share network is disclosed in which illustrative embodiments may be implemented. In the example of FIG. 2, two mobile devices, mobile device 210 and mobile device 230, may communicate with each other and with network 202. Mobile device 210 and mobile device 230 may be mobile devices such as mobile devices 104 in FIG. 1. Mobile device 210 may comprise power supply 212, geophysical positioning system 214, storage 216, display 217, direct transceiver 218, indirect transceiver 220, and processor 222. Mobile device 230 may be a similar mobile device as mobile device 210 and may have power supply 232, geophysical positioning system 234, storage 236, display 237, direct transceiver 238, indirect transceiver 240, and processor 242. Direct transceiver 218 of mobile device 210 may communicate directly with direct transceiver 238 of mobile device 230 by two-way wireless transmission along connection 246. Indirect transceiver 220 of mobile device 210 may communicate with network 202 by wireless connection 224. Indirect transceiver 240 of mobile device 230 may communicate with network 202 by wireless connection 244. Server computer 250 may comprise processor 252, storage 254, interface 256, and indirect transceiver 258. Server computer 250 may communicate with network 202 by wireless connection 262 and with database storage 260 by wireless connection 264. Wireless connection 262 and wireless connection 264 may be wired connections or combinations of wired and wireless connections.

Referring to FIGS. 3-6, a time step diagram is disclosed in which illustrative embodiments may be implemented. As used herein, time step diagram means that each figure shows a different configuration of mobile device locations representing a movement of the mobile devices over a period of time. FIGS. 3-6 may illustrate a time sequence of events in which four mobile devices, mobile device A 310, mobile device B 320, mobile device C 530, and mobile device D 610 interact based on their relative movements to locations where their direct transceivers can communicate and transmit information. The four mobile devices illustrated in FIGS. 3-6 may be mobile devices such as mobile devices 110 in FIG. 1 and mobile devices 210 and 230 in FIG. 2. In the illustrative example of FIG. 3, mobile device A 310 has a range represented by radius $R_A$ 312. Mobile device B 320 has a range represented by radius $R_B$ 322. In order to communicate directly each mobile device must be at a location where a circle defined by its radius at least interests the other mobile device. The radius of each circle defines a range of mobile device A 310 and mobile device B 320.

Figure 4:
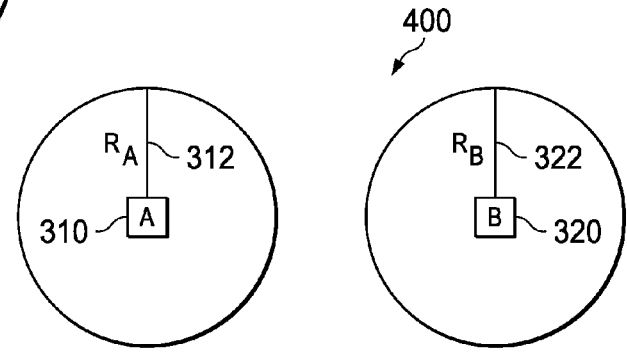
FIG. 4 is a time step diagram in conjunction with FIGS. 3, 5, and 6 in which an illustrative embodiment may be implemented.
Figure 5:
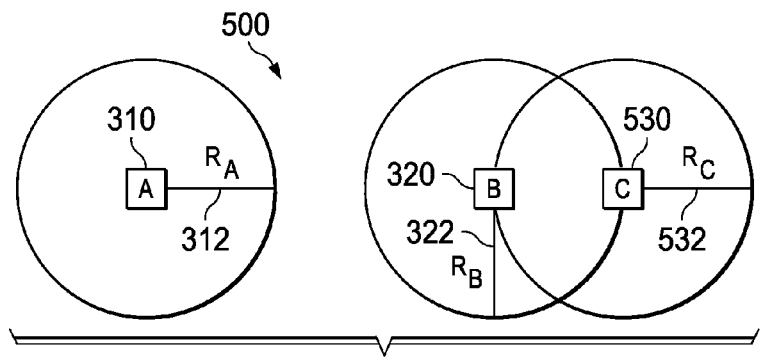
FIG. 5 is a time step diagram in conjunction with FIGS. 3, 4, and 6 in which an illustrative embodiment may be implemented.
Figure 6:
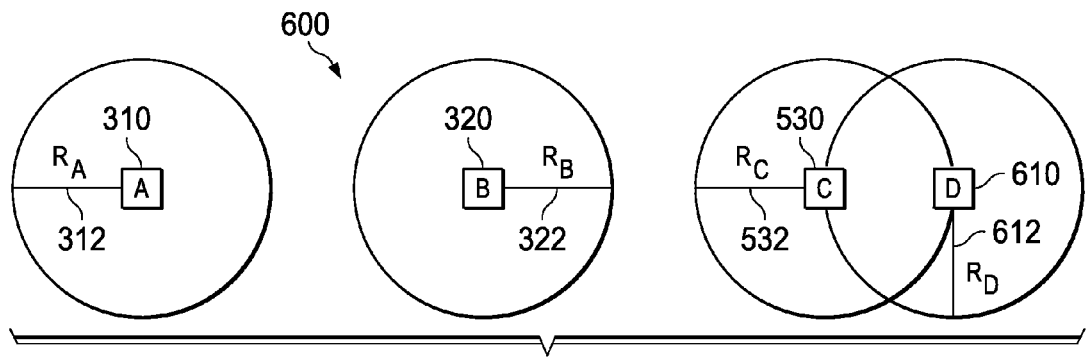
FIG. 6 is a time step diagram in conjunction with FIGS. 3-5 in which an illustrative embodiment may be implemented.

Referring to FIG. 4, mobile device A 310 and mobile device B 320 are shown to have moved apart so that neither mobile device is within range of the other. Referring to FIG. 5, mobile device A 110 and mobile device B 120 remain out of range of each other. Mobile device B 120 has moved within range of mobile device C 530. Referring to FIG. 6, mobile device C 530 has moved away from mobile device B so that neither mobile device is within range of the other for direct communication. Mobile device C 530 has moved within range of mobile device D 410.

Figure 7:
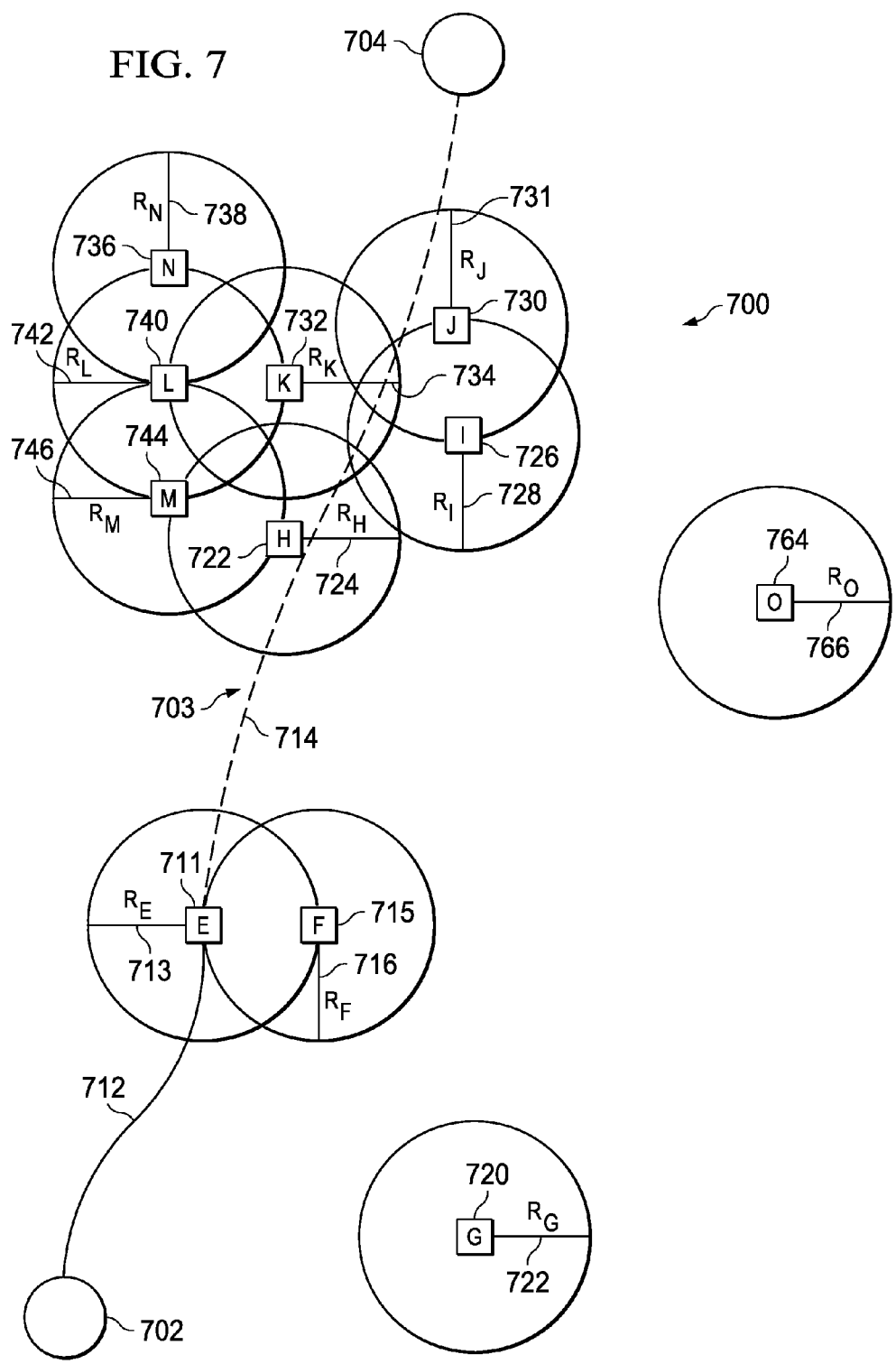
FIG. 7 is a display diagram of a share environment in accordance with the illustrative embodiments.

Referring to FIG. 7, a display diagram of a share environment is disclosed in accordance with the illustrative embodiments. In the example of FIG. 7, positions of a number of mobile devices may be shown at a point in time. All of the mobile devices depicted in the illustrative example of FIG. 7 may be mobile devices such as mobile devices 104 in FIG. 1 and mobile devices 210 and 230 in FIG. 2. Track 710 may extend from origin 702 to destination 704. Mobile device E 711 may be depicted at a point along track 710. Line 712 from origin 702 to mobile device E 711 may be solid to indicate that mobile device E 711 may have traversed that portion of track 710. Intended path 714 from mobile device E 711 to destination 704 may be dotted to indicate a portion of track 710 that mobile device E 711 has not yet traveled but intends to travel. Mobile device E has passed mobile device G 720 without making contact because mobile device E 711 did not close within radius $R_E$ 712 of mobile device G 720. Mobile device E 711 has come within radius $R_E$ 712 of mobile device F 715 and so can communicate with mobile device E 711. Mobile device E 711 is also within its radius $R_F$ 716 of mobile device E 711 so that mobile device F 715 can communicate with mobile device E 711.

Mobile device H 722, mobile device 1726, mobile device J 730, mobile device K 732, mobile device L 740, mobile device M 744, and mobile device N 736 comprise a cluster in which each mobile device can communicate with at least one other mobile device, and in some cases with more than one mobile device. Mobile device O 764 is located beyond the range of any mobile device in the cluster and beyond the range of mobile device E 711.

The illustrative embodiments recognize and take into account that clusters such as the cluster depicted in FIG. 7 may provide rapid dissemination of information as files may be transmitted from one device to another as a device comes into range of another device. Such rapid dissemination is an example of viral communication. In an example, a mall or stadium may contain large numbers of mobile devices within range of each other, and provide opportunities for communication between mobile devices via direct transceivers in the mobile devices.

Figure 8:
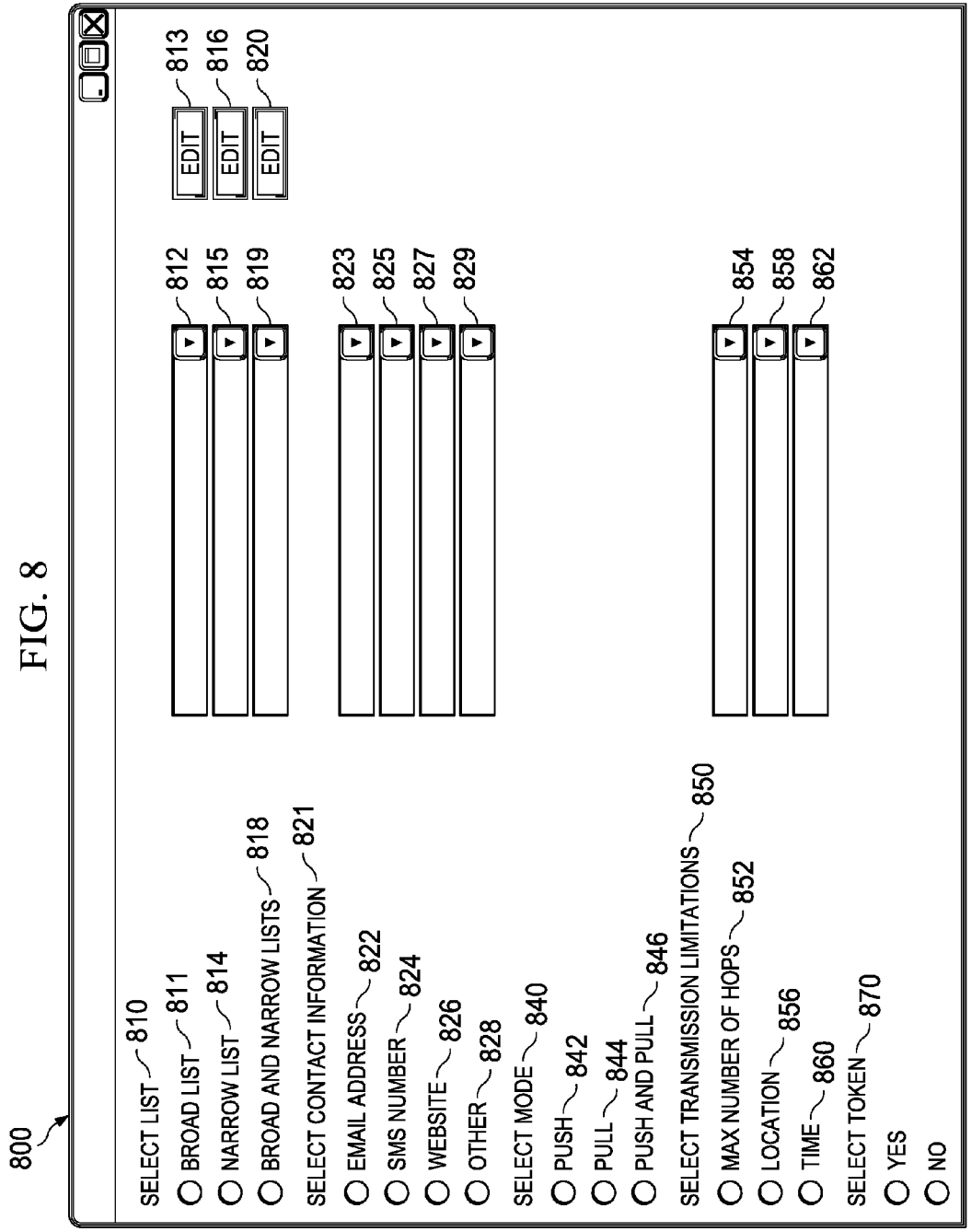
FIG. 8 is an interface in accordance with the illustrative embodiments.

Referring to FIG. 8, an interface is discloses in accordance with the illustrative embodiments. Interface 800 may be provided for configuring mobile devices for controlling transmission of data that has been sent by one mobile device and received by another mobile device after the two mobile devices are no longer within range of each other. Interface 800 may reside in storage 114 of mobile devices 110 in FIG. 1 and storage 216 of mobile device 210 and storage 236 of mobile device 230 in FIG. 2. In an embodiment, interface 800 may reside in computing systems 130 in FIG. 1. Interface 800 may comprise select list section 810, select contact information 821, select push or pull mode 840, select transmission limitations 850, and select token 870. Select list section 810 may enable a selection of broad list 811, narrow list 814, or broad and narrow lists 818. Broad list 811 and narrow list 814 may be broad list 116 and narrow list 117 in FIG. 1. Selection of broad list 811 may display drop down menu 812 where all broad lists associated with a mobile device may be viewed. Edit control 813 enables broad lists to be edited in drop down menu 812. Selection of narrow list 814 may display drop down menu 815 where all narrow lists associated with a mobile device may be viewed. Edit control 816 enables narrow lists to be edited in drop down menu 815. Selection of broad and narrow lists 818 may display drop down menu 819 where all broad and narrow lists associated with a mobile device may be viewed. Edit control 820 enables broad and narrow lists to be edited in drop down menu 819. Lists such as lists 114 in FIG. 1 may reside in storage 216 and 236 in FIG. 2. Select contact information 821 may enable a selection of email address 822, short message service number 824, website 826, or other address 828. Available email addresses may be displayed in drop down menu 823. Available short message service numbers may be displayed in drop down menu 825. Available websites may be displayed in drop down menu 827. Other available contact information may be displayed in drop down menu 829. Contact information is stored in profiles 142 in storage 137 in server 134 in FIG. 1.

Select mode 840 enables selection of push mode 842, pull mode 844 or push and pull mode 846. Push mode enables broadcast of information in broadcast file 119. In an embodiment, selected lists may be moved from lists 115 to broadcast file 119 in FIG. 1. Select transmission limitations 850 enables selection of maximum number of hops 852, location 856, or time 860. Selection of maximum number of hops 852 may be made using drop down menu 854 which may display a number of options for maximum number of hops. Selection of location may be made using drop down menu 858 which may display a number of options for location limitations. In an example, such a limitation may be a zip code or a distance representing a radius from the sending mobile device. Selection of time 860 may be may be made using drop down menu 862 which may display a number of options for time limitations.

Figure 9:
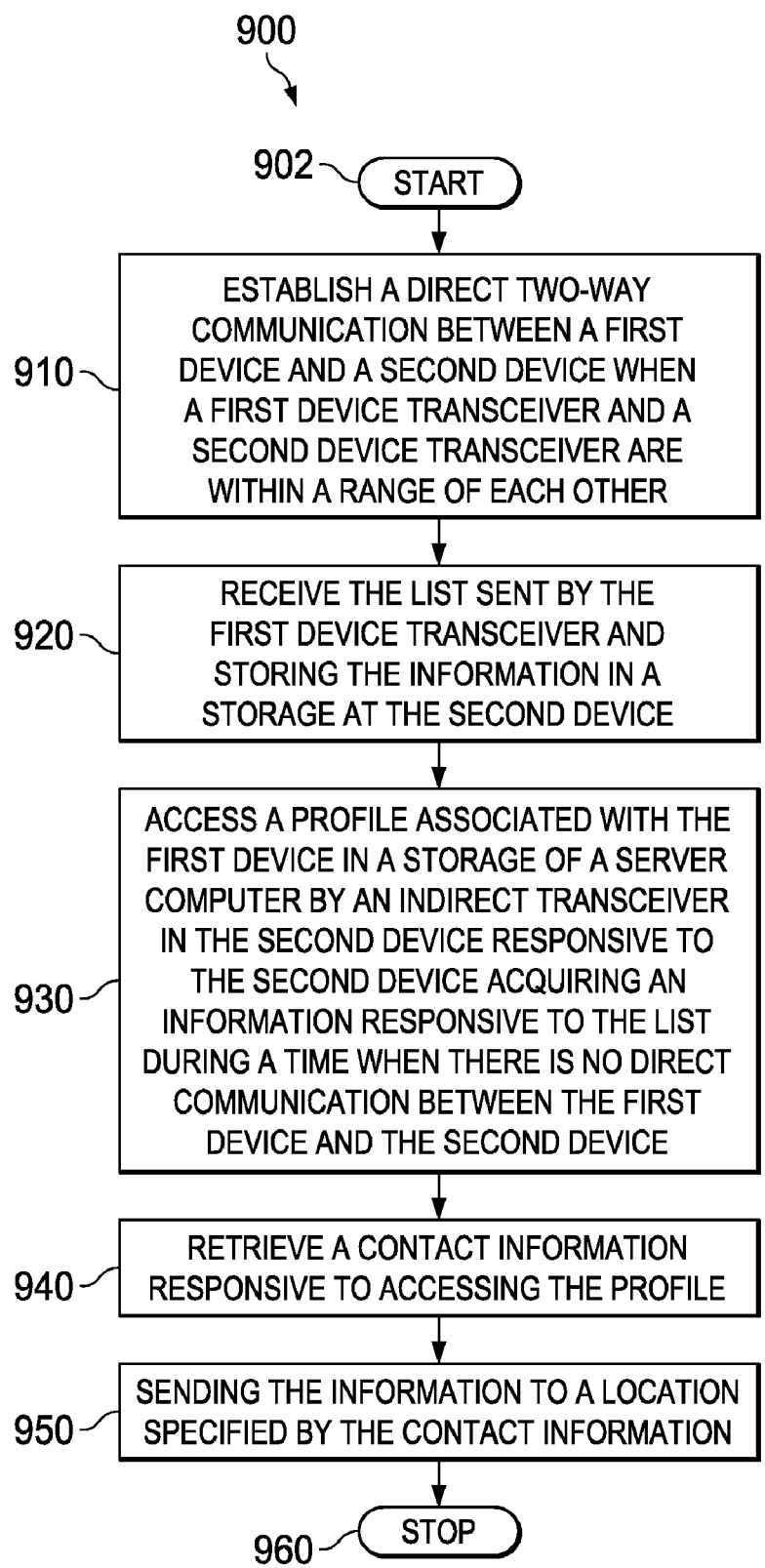
FIG. 9 is a flowchart of an operational process in accordance with the illustrative embodiments.

Referring to FIG. 9, a flowchart of an operational process is disclosed in accordance with the illustrative embodiments. Operational process 900 may reside in a storage such as storage 114 of mobile device 110 in FIG. 1, and storage 216 of mobile device 210 and storage 236 of mobile device 230 in FIG. 2. Operational process 900 starts (step 902) and establishes a direct two-way communication between a first device and a second device when a first device transceiver and a second device transceiver are within a range of each other (step 910). Operational process 900 receives the list sent by the first device transceiver and storing the information in a storage at the second device (step 920). The list may be a list from lists 115 in FIG. 1 and may be a broad list such as broad list 116 in FIG. 1 or a narrow list such as narrow list 117 in FIG. 1. Operational process 900 accesses a profile associated with the first device in a storage of a server computer by an indirect transceiver in the second device responsive to the second device acquiring an information responsive to the list during a time when there is no direct communication between the first device and the second device (step 930). The indirect transceiver may be an indirect transceiver such as indirect transceiver 112 in FIG. 1, indirect transceiver 220 and indirect transceiver 240 in FIG. 2. Operational process 900 retrieves a contact information responsive to accessing the profile (step 940). Contact information may be stored in profiles 142 in FIG. 1 and may be configured using interface 800 in FIG. 8. Operational process 900 sends the information to a location specified by the contact information (step 950). The process terminates thereafter (step 960).

Figure 10B:
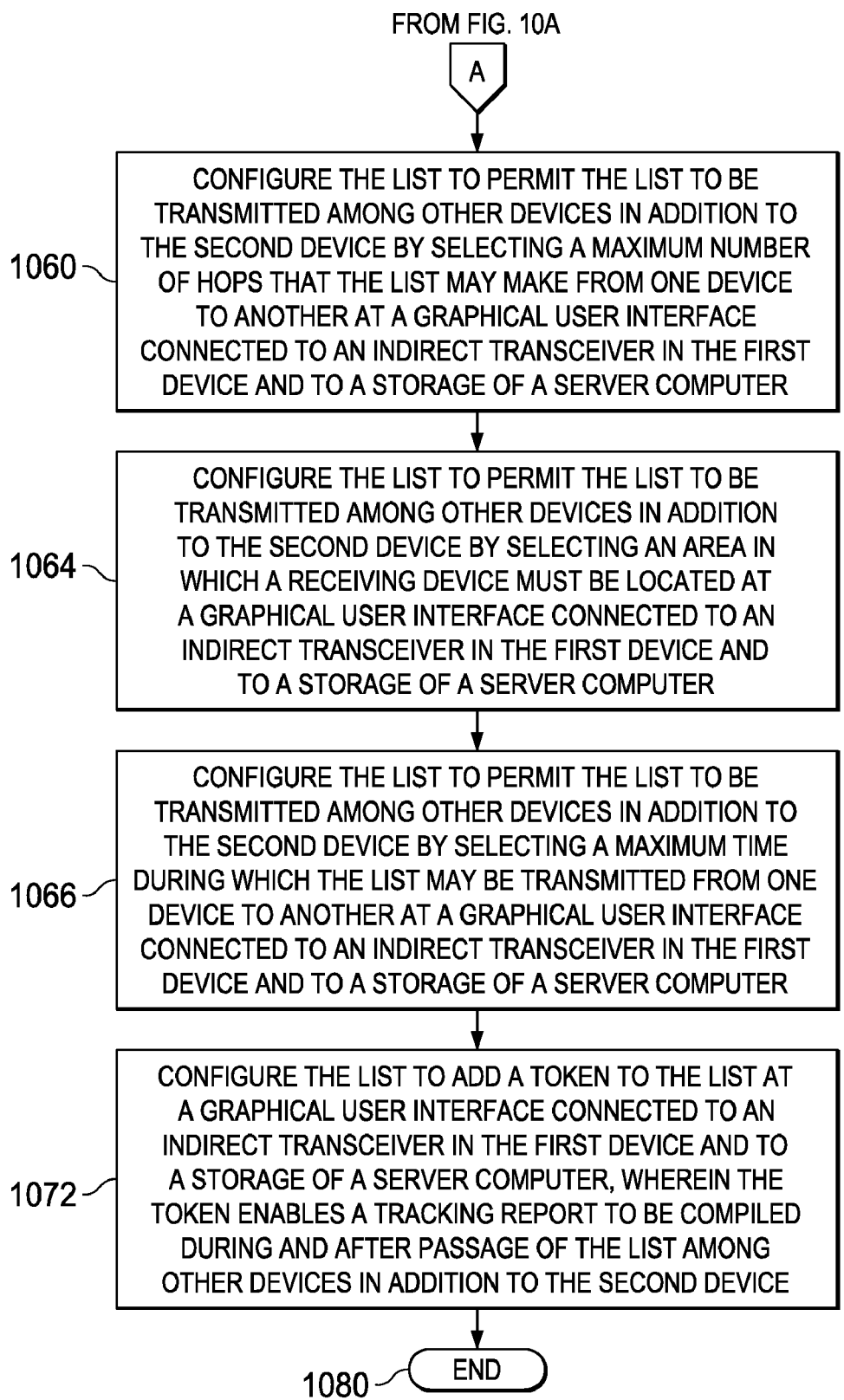

Referring to FIGS. 10A and 10B, a flowchart of a configuration process is disclosed in accordance with the illustrative embodiments. Configuration process 1000 starts (step 1002) and configures the list to be a broad list, a narrow list, or both a broad list and a narrow list by making a selection at a graphical user interface connected to an indirect transceiver in the first device and to a storage of a server computer (step 1010). The graphical user interface may be an interface such as interface 800 in FIG. 8. Configuration process 1000 configures the contact information by making a selection at a graphical user interface connected to an indirect transceiver in the first device and to a storage of a server computer (step 1020). A control is activated to select an email address, a short message service number, or a website address (step 1030). A control may be one of the controls in interface 800 in FIG. 8.

A number of email addresses, a number of short message service addresses, or a number of website addresses provided by a drop down menu on the graphical user interface are selected (step 1040). The graphical user interface may be an interface such as interface 800 in FIG. 8. A determination is made whether to select push mode, pull mode or both push and pull modes (step 1050). If push mode is selected, configuration process 1000 configures the device to transmit the list by making a selection of a push mode at a graphical user interface connected to an indirect transceiver in the first device and to a storage of a server computer (step 1052), and goes to step 1060. If pull mode is selected, configuration process 1000 configures the device to receive a second device list by making a selection of a pull mode at a graphical user interface connected to an indirect transceiver in the first device and to a storage of a server computer (step 1054). The graphical user interface may be an interface such as interface 800 in FIG. 8. If both push and pull modes are selected, configuration process 1000 configures the device to transmit the list and to receive a second device list by making a selection of both a pull mode and a push mode at a graphical user interface connected to an indirect transceiver in the first device and to a storage of a server computer (step 1056). The graphical user interface may be an interface such as interface 800 in FIG. 8.

Configuration process 1000 configures the list to permit the list to be transmitted among other devices in addition to the second device by selecting a maximum number of hops that the list may make from one device to another at a graphical user interface connected to an indirect transceiver in the first device and to a storage of a server computer (step 1060). The graphical user interface may be an interface such as interface 800 in FIG. 8. Configuration process 1000 configures the list to permit the list to be transmitted among other devices in addition to the second device by selecting an area in which a receiving device must be located at a graphical user interface connected to an indirect transceiver in the first device and to a storage of a server computer (step 1064). The graphical user interface may be an interface such as interface 800 in FIG. 8.

Configuration process 1000 configures the list to permit the list to be transmitted among other devices in addition to the second device by selecting a maximum time during which the list may be transmitted from one device to another at a graphical user interface connected to an indirect transceiver in the first device and to a storage of a server computer (step 1066). The graphical user interface may be an interface such as interface 800 in FIG. 8. Configuration process 1000 configures the list to add a token to the list at a graphical user interface connected to an indirect transceiver in the first device and to a storage of a server computer, wherein the token enables a tracking report to be compiled during and after passage of the list among other devices in addition to the second device (step 1072). Configuration process 1000 stops (step 1080). The graphical user interface may be an interface such as interface 800 in FIG. 8.

Figure 11:
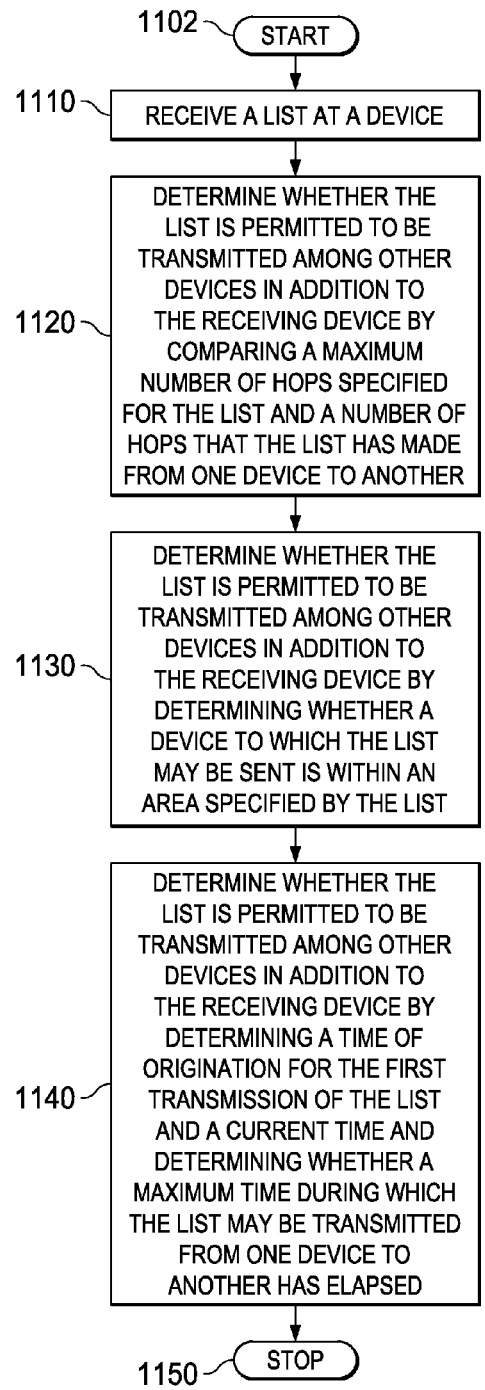
FIG. 11 is a flowchart of a receiving process in accordance with the illustrative embodiments.

Referring to FIG. 11, a flowchart of a receiving process in accordance with the illustrative embodiments. Receiving process 1100 starts (step 1102) and receives a list at a device (step 1110). Receiving process 1100 determines whether the list is permitted to be transmitted among other devices in addition to the receiving device by comparing a maximum number of hops specified for the list and a number of hops that the list has made from one device to another (step 1120). The maximum number of hops may be configured by configuration process 1000 in FIGS. 10A and 10B using interface 800 in FIG. 8. Receiving process 1100 determines whether the list is permitted to be transmitted among other devices in addition to the receiving device by determining whether a device to which the list may be sent is within an area specified by the list (step 1130). The location may be configured by configuration process 1000 in FIGS. 10A and 10B using interface 800 in FIG. 8. Receiving process 1100 determines whether the list is permitted to be transmitted among other devices in addition to the receiving device by determining a time of origination for the first transmission of the list and a current time and determining whether a maximum time during which the list may be transmitted from one device to another has elapsed (step 1140). The time may be configured by configuration process 1000 in FIGS. 10A and 10B using interface 800 in FIG. 8. Receiving process 1100 stops (step 1150).

Figure 12:
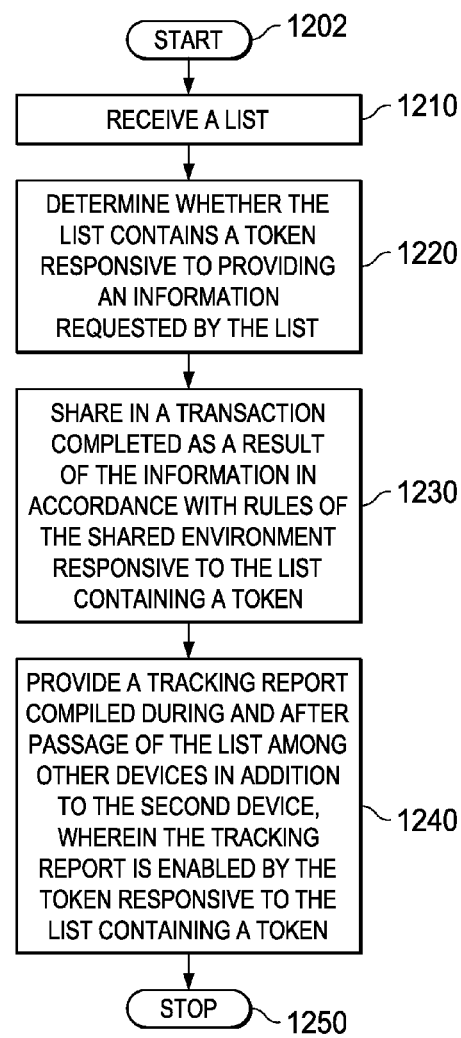
FIG. 12 is a flowchart of a tracking process in accordance with the illustrative embodiments.

Referring to FIG. 12, a flowchart of a tracking process is disclosed in accordance with the illustrative embodiments. Tracking process starts (step 1202) and receives a list (step 1220). Tracking process 1200 determines whether the list contains a token responsive to providing an information requested by the list (step 1220). Tracking process 1200 shares in a transaction completed as a result of the information in accordance with rules of the shared environment responsive to the list containing a token (step 1230). Process 1200 provides a tracking report compiled during and after passage of the list among other devices in addition to the second device, wherein the tracking report is enabled by the token responsive to the list containing a token (step 1240). Tracking process 1200 stops (step 1250).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission medium such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 13:
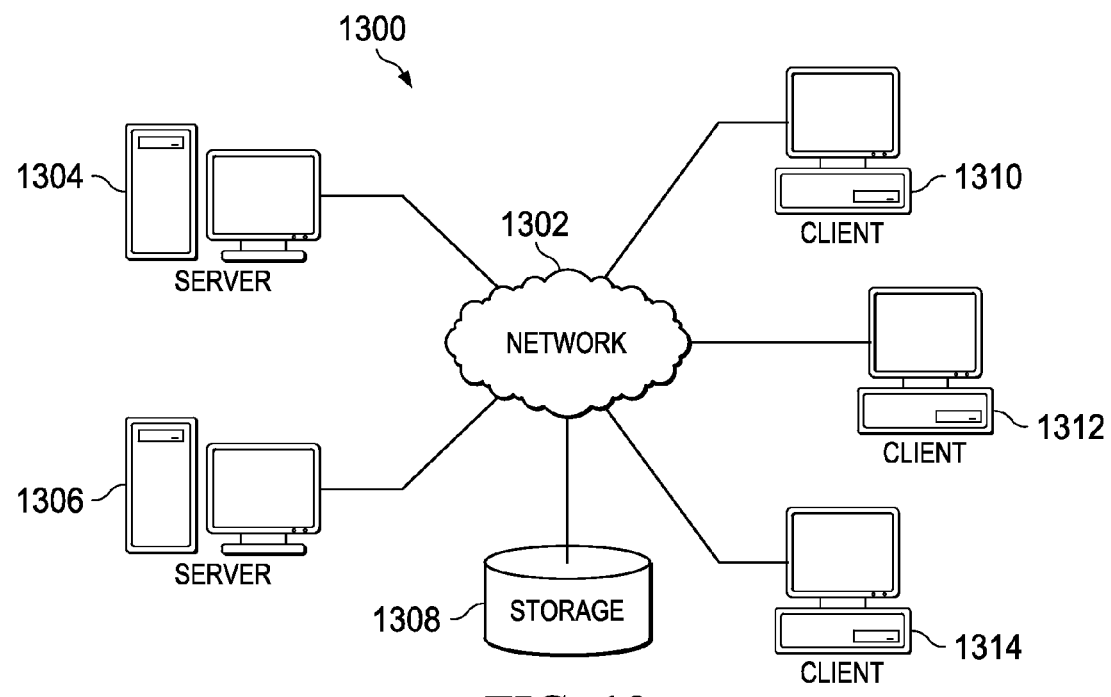
FIG. 13 is a computer network in which illustrative embodiments may be implemented.

With reference to FIGS. 13-14, exemplary diagrams of data processing environments are provided in which illustrative embodiments may be implemented. It should be appreciated that FIGS. 13-14 are only exemplary and are not intended to assert or imply any limitation with regard to the environments in which different embodiments may be implemented. Many modifications to the depicted environments may be made.

FIG. 13 depicts a pictorial representation of a network of data processing systems in which illustrative embodiments may be implemented. Network data processing system 1300 is a network of computers in which the illustrative embodiments may be implemented. Network data processing system 1300 contains network 1302, which is the medium used to provide communications links between various devices and computers connected together within network data processing system 1300. Network 1302 may include connections, such as wire, wireless communication links, or fiber optic cables.

In the depicted example, server 1304 and server 1306 connect to network 1302 along with storage unit 1308. In addition, clients 1310, 1312, and 1314 connect to network 1302. Clients 1310, 1312, and 1314 may be, for example, personal computers or network computers. In the depicted example, server 1304 provides information, such as boot files, operating system images, and applications to clients 1310, 1312, and 1314. Clients 1310, 1312, and 1314 are clients to server 1304 in this example. Network data processing system 1300 may include additional servers, clients, and other devices not shown.

Program code located in network data processing system 1300 may be stored on a computer recordable storage medium and downloaded to a data processing system or other device for use. For example, program code may be stored on a computer recordable storage medium on server 1304 and downloaded to client 1310 over network 1302 for use on client 1310.

In the depicted example, network data processing system 1300 is the Internet with network 1302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 1300 also may be implemented as a number of different types of networks, such as for example, an intranet, a local area network (LAN), or a wide area network (WAN). FIG. 13 is intended as an example, and not as an architectural limitation for the different illustrative embodiments.

With reference now to FIG. 14, a diagram of a data processing system is depicted in accordance with an illustrative embodiment. Data processing system 1400 is an example of a computer, such as server 1204 or client 1210 in FIG. 12, in which computer usable program code or instructions implementing the processes may be located for the illustrative embodiments. In this illustrative example, data processing system 1400 includes communications fabric 1402, which provides communications between processor unit 1404, memory 1406, persistent storage 1408, communications unit 1410, input/output (I/O) unit 1412, and display 1414.

Processor unit 1404 serves to execute instructions for software that may be loaded into memory 1406. Processor unit 1404 may be a set of one or more processors or may be a multi-processor core, depending on the particular implementation. Further, processor unit 1404 may be implemented using one or more heterogeneous processor systems, in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Memory 1406, in these examples, may be, for example, a random access memory, or any other suitable volatile or non-volatile storage device. Persistent storage 1408 may take various forms, depending on the particular implementation. For example, persistent storage 1408 may contain one or more components or devices. For example, persistent storage 1408 may be a hard drive, a flash memory, a rewritable optical disk, a rewritable magnetic tape, or some combination of the above. The medium used by persistent storage 1408 may be removable. For example, a removable hard drive may be used for persistent storage 1408.

Communications unit 1410, in these examples, provides for communication with other data processing systems or devices. In these examples, communications unit 1410 is a network interface card. Communications unit 1410 may provide communications through the use of either or both physical and wireless communications links.

Input/output unit 1412 allows for the input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications fabric 1402. In these illustrative examples, the instructions are in a functional form on persistent storage 1408. These instructions may be loaded into memory 1406 for execution by processor unit 1404. The processes of the different embodiments may be performed by processor unit 1404 using computer implemented instructions, which may be located in a memory, such as memory 1406.

These instructions are referred to as program code, computer usable program code, or computer readable program code that may be read and executed by a processor in processor unit 1404. The program code, in the different embodiments, may be embodied on different physical or computer readable storage medium, such as memory 1406 or persistent storage 1408.

Program code 1418 is located in a functional form on computer readable medium 1420 that is selectively removable and may be loaded onto or transferred to data processing system 1400 for execution by processor unit 1404. Program code 1418 and computer readable medium 1420 form computer program product 1422. In one example, computer readable medium 1420 may be computer readable storage medium 1424 or computer readable signal medium 1426. Computer readable storage medium 1424 may include, for example, an optical or magnetic disc that is inserted or placed into a drive or other device that is part of persistent storage 1408 for transfer onto a storage device, such as a hard drive, that is part of persistent storage 1408. Computer readable storage medium 1424 also may take the form of a persistent storage, such as a hard drive, a thumb drive, or a flash memory that is connected to data processing system 1400. In some instances, computer readable storage medium 1424 may not be removable from data processing system 1400.

Alternatively, program code 1418 may be transferred to data processing system 1400 using computer readable signal medium 1426. Computer readable signal medium 1426 may be, for example, a propagated data signal containing program code 1418. For example, computer readable signal medium 1426 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable medium also may take the form of non-tangible medium, such as communications links or wireless transmissions containing the program code.

In some illustrative embodiments, program code 1418 may be downloaded over a network to persistent storage 1408 from another device or data processing system through computer readable signal medium 1426 for use within data processing system 1400. For instance, program code stored in a computer readable storage medium in a server data processing system may be downloaded over a network from the server to data processing system 1400. The data processing system providing program code 1418 may be a server computer, a client computer, or some other device capable of storing and transmitting program code 1418.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of executing program code. As one example, data processing system 1400 may include organic components integrated with inorganic components and/or may be comprised entirely of organic components excluding a human being. For example, a storage device may be comprised of an organic semiconductor.

As another example, a storage device in data processing system 1400 is any hardware apparatus that may store data. Memory 1406, persistent storage 1408, and computer readable medium 1420 are examples of storage devices in a tangible form.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1406 or a cache such as found in an interface and memory controller hub that may be present in communications fabric 1402.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   establishing, by a second mobile device, a direct two-way communication in a shared direct communication environment with a first mobile device when a first mobile device direct transceiver and a second mobile device direct transceiver are within a range of each other;
   responsive to receiving, at the second mobile device, a list sent by the first mobile device direct transceiver, storing the list in a storage at the second mobile device;
   responsive to the second mobile device acquiring information responsive to the list and also responsive to the second mobile device direct transceiver being out of range of the first mobile device direct transceiver, accessing a profile associated with the first mobile device in a storage of a server computer by an indirect transceiver in the second mobile device;
   responsive to accessing the profile, retrieving contact information; and
   sending the acquired information to a location specified by the contact information.

2. The method of claim 1 further comprising:
   determining, at the second mobile device, that the list is one of a broad list, a narrow list, and both a broad list and a narrow list.

3. The method of claim 1, wherein the contact information comprises one of an email address, a short message service number, and a website address.

4. The method of claim 2 further comprising one of:
   transmitting, by the second mobile device, the list in a push mode
   receiving a second list in a pull mode and
   transmitting the list in a push mode and receiving a second list in a pull mode.

5. The method of claim 1 further comprising:
   identifying a maximum number of hops that the list may make from one mobile device to another mobile device after transmission by the second mobile device.

6. The method of claim 1 further comprising:
   identifying an area in which a receiving mobile device must be located in order to receive the list after transmission by the second mobile device.

7. The method of claim 1 further comprising:
   identifying a maximum time during which the list may be transmitted from one mobile device to another after transmission by the second mobile device.

8. The method of claim 1 further comprising:
   adding a token to the list, wherein the token enables a tracking report to be compiled during and after passage of the list among other mobile devices in addition to the second mobile device and after transmission by the second mobile device.

9. A computer system comprising:
   one or more processors, one or more computer readable memories, and one or more computer readable storage mediums;
   first program instructions for establishing, by a second mobile device, a direct two-way communication in a shared direct communication environment with a first mobile device when a first mobile device direct transceiver and a second mobile device direct transceiver are within a range of each other;
   second program instructions for, responsive to receiving, at the second mobile device, a list sent by the first mobile device direct transceiver, storing the list in a storage at the second mobile device;
   third program instructions for, responsive to the second mobile device acquiring information responsive to the list and also responsive to the second mobile device direct transceiver being out of range of the first mobile device transciever,
   accessing a profile associated with the first mobile device in a storage of a server computer by an indirect transceiver in the second mobile device;
   fourth program instructions for, responsive to accessing the profile, retrieving contact information; and
   fifth program instructions for sending the acquired information to a location specified by the contact information;
   wherein the first, second, third, fourth, and fifth, program instructions are stored on at least one of the one or more computer readable storage mediums for execution by at least one of the one or more processors via at least one of the one or more computer readable memories.

10. The computer system of claim 9 further comprising:
sixth program instructions for determining that the list is a broad list, a narrow list, or both a broad list and a narrow list;
wherein the sixth program instructions are stored on at least one of the one or more computer readable storage mediums for execution by at least one of the one or more processors via at least one of the one or more computer readable memories.

11. The computer system of claim 9, further comprising:
sixth program instructions for determining that the contact information is one of an email address, a short message service number, and a website address;
wherein the sixth program instructions are stored on at least one of the one or more computer readable storage mediums for execution by at least one of the one or more processors via at least one of the one or more computer readable memories.

12. The computer system of claim 10 further comprising one of:
seventh program instructions for transmitting, by the second mobile device, the list in a push mode;
eighth program instructions for receiving a second list in a pull mode; and
ninth program instructions for transmitting the list in a push mode and and receiving a second list in a pull mode;
wherein the seventh, eighth, and ninth program instructions are stored on at least one of the one or more computer readable storage mediums for execution by at least one of the one or more processors via at least one of the one or more computer readable memories.

13. The computer system of claim 9 further comprising:
sixth program instructions for identifying a maximum number of hops that the list may make from one mobile device to another after transmission by the second mobile device;
wherein the sixth program instructions are stored on at least one of the one or more computer readable storage mediums for execution by at least one of the one or more processors via at least one of the one or more computer readable memories.

14. The computer system of claim 9 further comprising:
sixth program instructions for identifying an area in which a receiving mobile device must be located in order to receive the list after transmission by the second mobile device;
wherein the sixth program instructions are stored on at least one of the one or more computer readable storage mediums for execution by at least one of the one or more processors via at least one of the one or more computer readable memories.

15. The computer system of claim 9 further comprising:
sixth program instructions for identifying a maximum time during which the list may be transmitted from one mobile device to another;
wherein the sixth program instructions are stored on at least one of the one or more computer readable storage mediums for execution by at least one of the one or more processors via at least one of the one or more computer readable memories.

16. The computer system of claim 9 further comprising:
sixth program instructions for adding a token to the list, wherein the token enables a tracking report to be compiled during and after passage of the list among other mobile devices in addition to the second mobile device and after transmission by the second mobile device;
wherein the sixth program instructions are stored on at least one of the one or more computer readable storage mediums for execution by at least one of the one or more processors via at least one of the one or more computer readable memories.

17. A computer program product comprising:
one or more computer readable storage mediums;
first program instructions for establishing, by a second mobile device, a direct two-way communication in a shared direct communication environment with a first mobile device when a first mobile device direct transceiver and a second mobile device direct transceiver are within a range of each other;
second program instructions for, responsive to receiving, at the second mobile device, a list sent by the first mobile device direct transceiver, storing the list in a storage at the second mobile device;
third program instructions for, responsive to the second mobile device acquiring information responsive to the list and also responsive to the second mobile device direct transceiver being out of range of the first mobile device direct transceiver, accessing a profile associated with the first mobile device in a storage of a server computer by an indirect transceiver in the second mobile device;
fourth program instructions for, responsive to accessing the profile, retrieving contact information; and
fifth program instructions for sending the acquired information to a location specified by the contact information;
wherein the first, second, third, fourth, and fifth, program instructions are stored on at least one of the one or more computer readable storage mediums.

18. The computer program product of claim 17 further comprising:
sixth program instructions for determining that the list is one of a broad list, a narrow list, or both a broad list and a narrow list;
wherein the sixth program instructions are stored on at least one of the one or more computer readable storage mediums.

19. The computer program product of claim 17 further comprising:
sixth program instructions for identifying the contact information;
wherein the sixth program instructions identify one of an email address, a short message service number, and a website address; and;
wherein the sixth program instructions are stored on at least one of the one or more computer readable storage mediums.

20. The computer program product of claim 17 further comprising one of:
sixth program instructions for transmitting the list in a push mode;
seventh program instructions for receiving a second list in a pull mode and
eighth program instructions for transmitting the list in a push mode and receiving a second list a pull mode;
wherein the sixth, seventh, and eighth program instructions are stored on at least one of the one or more computer readable storage mediums.

21. The computer program product of claim 17 further comprising:
sixth program instructions identifying a maximum number of hops that the list may make from one mobile device to another after transmission by the second mobile device;

seventh program instructions for identifying an area in which a receiving mobile device must be located in order to receive the list after transmission by the second mobile device;

eighth program instructions for identifying a maximum time during which the list may be transmitted from one mobile device to another after transmission by the second mobile device;

wherein the sixth, seventh, and eighth program instructions are stored on at least one of the one or more computer readable storage mediums.

22. The computer program product of claim 17 further comprising:

sixth program instructions for adding a token to the list, wherein the token enables a tracking report to be compiled during and after passage of the list among other mobile devices in addition to the second mobile device and after transmission by the second mobile device;

wherein the sixth program instructions are stored on at least one of the one or more computer readable storage mediums.

* * * * *